Jan. 13, 1959 J. W. FRIED 2,868,045
CHAMFERING AND DEBURRING TOOL
Filed Oct. 10, 1955
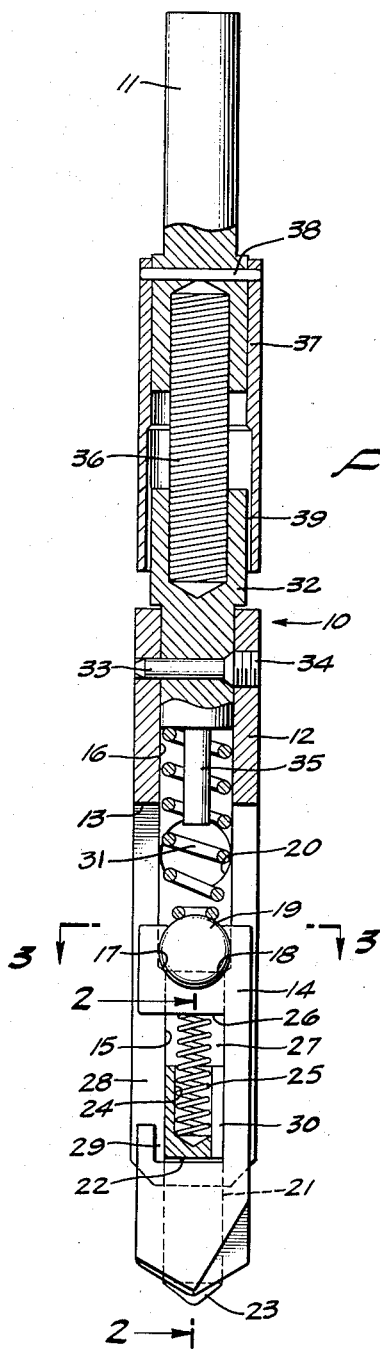
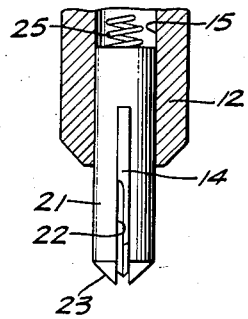
FIG. 2.
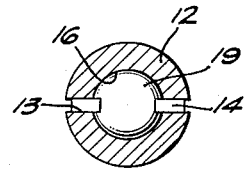
FIG. 3.
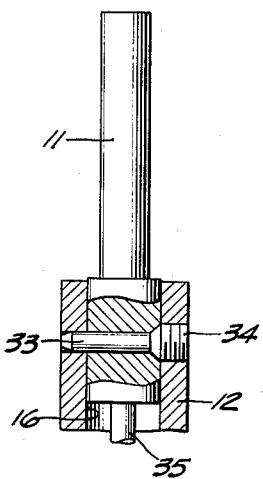
FIG. 4.
JOSEPH W. FRIED
INVENTOR.
BY Hazard & Miller
ATTORNEYS

# United States Patent Office 2,868,045
Patented Jan. 13, 1959

2,868,045
CHAMFERING AND DEBURRING TOOL
Joseph W. Fried, North Hollywood, Calif.
Application October 10, 1955, Serial No. 539,518
12 Claims. (Cl. 77—73.5)

This invention relates to a chamfering and deburring tool and may be considered as an improvement upon or further development of the type of deburring and chamfering tool disclosed in my copending application Serial No. 467,365, filed November 8, 1954 which issued as Patent No. 2,858,811, October 14, 1958.

As set forth in my copending application, there are many situations wherein holes are drilled through machine parts in such a direction that the axis of the hole is arranged at an angle other than a right angle to a planar surface on which the end of the hole terminates. In other situations, particularly in drilling oil passages in crank shafts, the hole may terminate on a cylindrical surface such as, for example, the cylindrical surface of a crank pin. Frequently the axis of the hole is not arranged at right angles to the axis of the crank pin and in some instances the axis of the hole is arranged other than in a plane that is radial of the crank pin. In all of these situations the edges of the hole, where it terminates either on a planar surface or on a cylindrical surface, define either an ellipse or a modified ellipse and it is desirable to remove burrs occasioned by drilling the hole and, frequently, to chamfer these edges. The construction disclosed in my copending application is a tool for deburring and chamfering these elliptically-shaped edges that occur at the ends of holes which terminate either on planar surfaces or on other surfaces. Essentially the tool consists of a shank which is rotatable about its longitudinal central axis and which has a blade projecting from one end thereof on which diametrically arranged cutting edges are formed. The blade is spring-urged toward the end of the shank and is mounted on the shank by a construction that permits the blade to move longitudinally relatively to the shank against the action of the spring and also to swing laterally relatively to the shank within limits so that the blade in effect may adjust itself both longitudinally and laterally with respect to the shank in following the general contour of the more or less elliptically-shaped edges at the end of the hole and effecting a cut thereon for the purpose of either removing burrs or chamfering.

One object of the present invention is to provide an improved tool of the general character above described wherein there is a pilot associated with the blade and normally projecting beyond the blade. This pilot is retractible with respect to the blade so as to expose its cutting edges to effect a deburring or chamfering operation. However, as the tool approaches the work the pilot enters the hole and tends to seat itself across a minor axis of the ellipse or elliptically-shaped edges. This engagement between the pilot and edges of the hole has a stabilizing effect on the cutting blade, tending to cause the cutting blade to perform its operation smoothly and easily without chattering and also cause the cutting effect to be more evenly distributed around the edges of the hole.

Another object of the invention is to provide a deburring and chamfering tool having the above mentioned characteristics wherein the shank includes a section of flexible shaft between the spindle by which the shank is rotated and the body of the shank. The flexible shaft enables some flexibility in the shank between limits. Frequently in the course of drilling holes in the work the bit wanders or tends to deviate from its intended direction so that if the deburring and chamfering tool is mounted on a chuck that is rotatable about a fixed axis with relation to the work the axis of the deburring and chamfering tool may not be coincident with the axis of the hole whose edges are to be deburred or chamfered. The flexibility afforded by the flexible shaft enables the deburring and chamfering tool to flex or bend sufficiently to accommodate itself to the ends of holes which may have wandered or deviated from their intended directions through the work.

With the foregoing and other objects in view, which will be made manifest in the following detailed description and specifically pointed out in the appended claims, reference is had to the accompanying drawings for an illustrative embodiment of the invention, wherein:

Figure 1 is a vertical section through the deburring and chamfering tool embodying the present invention;

Fig. 2 is a partial view in vertical section taken substantially upon the line 2—2 on Fig. 1 in the direction indicated;

Fig. 3 is a horizontal section taken substantially upon the line 3—3 upon Fig. 1; and Fig. 4 is a partial view in vertical section illustrating an alternative form of construction.

Referring to the accompanying drawings wherein similar reference characters designate similar parts throughout, the improved chamfering and deburring tool consists of a shank generally indicated at 10 which is rotated about its longitudinal central axis by means of a spindle 11 adapted to be clamped in a chuck which is power-rotated. The shank 10 is made up of a plurality of parts the lower of which is indicated at 12. This lower part has a diametrically extending slot 13 formed in its lower end adapted to receive a cutting blade 14. The blade 14 has cutting edges on its lower end which are disposed on opposite sides of the axis of rotation of the tool. These cutting edges are disposed either on or slightly behind a diameter extending through the blade in the plane of the blade. Consequently, as viewed in Fig. 1, in forming these cutting edges each side of the blade has the forward portion thereof removed. In the bottom of the shank there is a hole of reduced diameter indicated at 15 and in the top of the part 12 the hole is enlarged as indicated at 16 to provide an upwardly facing shoulder 17. The blade 14 has an aperture 18 formed therein adjacent its upper end adapted to receive a ball 19. This ball can be inserted into the part 12 and caused to assume its position in the aperture 18 by passing the ball through an aperture 20 formed in one side of the part 12. When the blade 14 is in its uppermost position in the slot 13 the aperture 18 can be caused to register with the aperture 20 and while in such position the ball 19 can be inserted through the aperture 20 and passed into the aperture 18. When the ball has been positioned in the aperture 18 in the blade and the blade is moved into a lower position, as shown in Fig. 1, the ball merely slides downwardly through the enlarged portion 16 of the hole 15 until it encounters the shoulder 17 which limits downward movement of the blade with respect to the shank. As the ball is vertically slidable in the enlarged portion 16 it forms a slidable and also a pivotal connection between the blade 14 and the shank 10, enabling the blade to move vertically with respect to the shank and also to swing laterally relatively thereto in the diametrical slot 13. In the lower or reduced portion of the hole 15 formed in the bottom of the part 12 of the shank there is disposed a pilot 21 which is slidable in the hole and which is diametrically slotted at its lower end as indicated at 22 to slidably accommodate the lower portion of the blade 14. The bottom of this pilot is conically shaped as indicated at 23 and normally projects a short distance below the end of the blade. The top of the pilot is recessed, as indicated at 24, to accommodate the lower portion of a compression spring 25 which is compressed between the pilot and the edge 26 on the blade. The edge 26 is the upper boundary of an opening 27 formed in the blade which has a lateral entrance 28. The height of the opening 27 is greater than the upper or unbifurcated portion of the pilot and the height of the entrance 28 is likewise at least as great as, if not greater than, the upper unbifurcated portion of the pilot so that this portion can be slipped laterally through the entrance 28 and into the opening 27 in the course of assembly. A small clearance 29 exists between the lower side of the entrance 28 and the side of the pilot and the pilot is preferably grooved as at 30 to provide a clearance for the opposite side of the opening 27. These two clearances enable the blade 14 to swing about the ball 19 as a center from side to side with respect to the shank, such movement occurring in the slot 13 and in the slot 22 of the pilot.

The ball 19 and consequently the blade 14, the pilot 21 and the spring 25 are urged toward the lower end of the shank by a compression spring 31 which is compressed between that portion of the ball which projects above the top edge of the blade 14 and the plug or cap 32 that is pinned in the top of the lower part 12 by means of a pin 33 having a threaded head 34. The plug preferably has attached thereto a downwardly extending extension 35 that projects partially over the aperture 20 so that when the device is assembled the ball 19 can never rise to a position in registration with the aperture 20.

The top of the plug 32 is recessed and a section of flexible shaft 36 has its lower end secured therein. The upper end of this flexible shaft is secured in a recess in the bottom of the spindle 11. A skirt 37 is pinned to the spindle as by a pin 38 and this skirt not only surrounds the flexible shaft 36 but extends downwardly over the plug 32 in spaced relation thereto. The flexible shaft is preferably formed of a section of helically coiled spring wire whose convolutions are normally in mutual engagement with each other. The flexible shaft serves to transmit torque from the spindle 11 to the lower portion of the shank and also to permit bending of the shank within the limits permitted by the clearances 39 between the bottom of the skirt and the plug 32.

The operation of the above described construction is as follows: The spindle 11 may be assumed to have been inserted and tightened in a rotatable chuck by which the tool is rotated about its vertical central axis. As the tool approaches the work the pilot 21 first engages the edges of the hole which are to be deburred or chamfered. If the edges of the hole define an ellipse or are of generally ovate configuration, the conical surface 23 merely seats itself across a minor axis of the ellipse. As the tool is forced toward the work the pilot recedes in relation to the blade 14 it being understood that the spring 25 is weaker than the compression spring 31. This recession or retraction of the pilot in relation to the blade 14 enables the cutting edges of the blade to project therebeyond a sufficient distance to effect a deburring or chamfering of the edges of the hole. The edges of the blade are preferably so formed and ground as to be arranged exactly on a diameter of the tool and in the course of advancing the tool toward the work the compression spring 31 is compressed. When the blade 14 is across a minor diameter of the ellipse the blade normally will be at its highest elevation with relation to the shank and as the blade rotates to a position extending across a major axis of the ellipse the blade projects from the shank to its greatest extent in the course of cutting. The spring 31 is consequently compressed and somewhat relieved as the blade rotates from major axis position to minor axis position and back to major axis position.

In deburring and chamfering oil passage holes drilled in crank shafts and similar work pieces the chucks in which the spindles 11 are mounted are usually arranged in alignment with the intended axes of the holes that are drilled in the crank shafts. However, in the course of drilling such holes the drilling bit frequently wanders or deviates slightly from the intended direction so that at least at the end of the hole the axis of the hole is not coincident with the axis of the chuck. Consequently the edges of the hole may be slightly displaced from their intended positions. When this occurs the flexible shaft 36 permits bending of the shank between the spindle 11 and the lower part 12 within limits afforded by the clearances 39. This permits the pilot 21 and consequently the blade 14 to shift laterally with relation to the spindle 11 and thus accommodate themselves to a hole whose end or terminus is slightly displaced without altering the position of the chuck in which the spindle 11 is receivable.

There are many situations in which the edges of the hole do not form a true ellipse but, on the contrary, form a modified ellipse or are of egg-shaped configuration. The lateral swinging movement of the blade 14 in the slot 13 about the ball 19 as a center, as is permitted by the clearances 29 and 30, enables the blade to adjust itself to situations wherein the edges of the hole are irregular or egg-shaped in configuration, and do not lie equidistant from the position assumed by the pilot as measured in the plane established by the two cutting edges.

Where the tool is to be used in a portable motor-driven chuck that is manually held adjacent the work, it is unnecessary to employ the flexible shaft 36 or the skirt 37. Consequently, under such circumstances, the spindle 11 may be pinned directly to the lower part 12 of the shank by means of the pin 33, as depicted in Fig. 4. With this arrangement the manually supported motor-driven chuck is manually adjusted so as to properly position the tool with relation to the end of the hole whose edges are to be deburred or chamfered.

It will be appreciated from the above described construction that the presence of the pilot facilitates the location of the blade 14 with relation to the approximate center of the hole whose edges are to be deburred or chamfered. Furthermore the arms of the pilot which slidably bear against the sides of the blade tend to stabilize the blade and avoid chattering. The presence of the pilot, however, in no way interferes with the proper operation or cutting action of the blade and if the configuration of the hole is such as to require the blade to swing from side to side in the slot 13, the pilot in no way interferes with such swinging movement. The pilot, however, does limit the swinging movement of the blade when either of the clearances 29 or 30 are exhausted.

It will be appreciated that the improved tool is of relatively simple construction and has parts which can be easily and quickly manufactured and assembled. These parts can also be readily disassembled from each other for purposes of replacement should occasion require.

Various changes may be made in the details of construction without departing from the spirit and scope of the invention as defined by the appended claims.

I claim:

1. A deburring and chamfering tool comprising a shank rotatable about a longitudinal central axis, a blade having only two cutting edges disposed on opposite sides of said axis, said blade being loosely disposed in a diametric slot in the shank so as to be laterally swingable therein, spring means urging the blade to project from the end of the shank but permitting the blade to be forced into the shank, means providing a pivot for the blade slidable in the shank enabling the blade to move laterally in said slot and to move longitudinally relatively thereto, a pilot slidable on the shank embracing opposite sides of the blade and normally extending beyond the blade, and spring means urging the pilot into its normal position but permitting the pilot to be forced toward the shank to fully expose the cutting edges of the blade.

2. A deburring and chamfering tool comprising a shank rotatable about a longitudinal central axis, a blade having only two cutting edges disposed on opposite sides of said axis slidably and swingably mounted in a diametric slot in the shank, spring means urging the blade to project from the edge of the shank and to assume a central position relatively thereto, a pilot slidable in the shank and having portions bearing against opposite sides of the blade, and spring means urging the pilot into a position projecting beyond the blade but permitting it to be forced longitudinally of the blade to expose edges thereof for cutting.

3. A deburring and chamfering tool comprising a shank rotatable about a longitudinal central axis, a blade having only two cutting edges disposed on opposite sides of said axis slidably and swingably mounted in a diametric slot in the shank, spring means urging the blade to project from the edge of the shank and to assume a central position relatively thereto, a pilot slidable in the shank and having portions bearing against opposite sides of the blade, spring means urging the pilot into a position projecting beyond the blade but permitting it to be forced longitudinally of the blade to expose edges thereof for cutting, said shank having a portion thereof flexible, and means limiting lateral bending of the flexible portion of the shank.

4. A deburring and chamfering tool comprising a shank rotatable about a longitudinal central axis, a blade slidably and swingably mounted in a diametric slot in the shank, spring means urging the blade to project from the end of the shank and to assume a central position relatively thereto, a pilot slidable on the blade having portions slidable against the sides thereof, and spring means compressed between the pilot and the blade urging the pilot into a position projecting beyond the blade but permitting the pilot to be forced relatively to the blade to expose edges of the blade for cutting.

5. A deburring and chamfering tool comprising a shank rotatable about a longitudinal central axis, a blade having only two cutting edges disposed on opposite sides of said axis and loosely disposed in a diametric slot in the shank so as to be laterally swingable therein, means mounting the blade on the shank enabling it to move longitudinally and to swing laterally relatively thereto in the slot, spring means urging the blade toward the end of the shank, and a pilot through which a portion of the blade is disposed, the lateral swinging movement of the blade relatively to the shank being limited by the pilot.

6. A deburring and chamfering tool comprising a shank rotatable about a longitudinal central axis, a blade loosely disposed in a diametric slot in the shank so as to be laterally swingable therein, means mounting the blade on the shank enabling it to move longitudinally and to swing laterally relatively thereto in the slot, spring means urging the blade toward the end of the shank, a pilot slidably engaging the shank and the blade, and spring means between the pilot and the blade urging the pilot into a position projecting beyond the blade but enabling the pilot to be forced into retracted position relatively to the blade.

7. A deburring and chamfering tool comprising a shank rotatable about a longitudinal central axis, a blade having only two cutting edges disposed on opposite sides of said axis and loosely disposed in a diametric slot in the shank so as to be laterally swingable therein, means mounting the blade on the shank enabling it to move longitudinally and to swing laterally relatively thereto in the slot, spring means urging the blade toward the end of the shank, a pilot through which a portion of the blade is disposed, the lateral swinging movement of the blade relatively to the shank being limited by the pilot, a portion of said shank being formed of a flexible shaft enabling the shank to bend laterally, and a skirt on the shank surrounding the flexible shaft and disposed in spaced relation to a portion of the shank and serving to limit lateral bending of the shank.

8. A deburring and chamfering tool comprising a shank rotatable about a longitudinal central axis, there being a hole in the bottom of the shank, a pilot slidable in said hole, a blade disposed in a diametric slot in the shank having a portion slidably extending through a diametric slot in the pilot, a compression spring between the pilot and the blade urging the pilot into a normal projecting position extending beyond the blade, a ball extending through the blade and disposed in the upper portion of said hole in the shank, there being an upwardly facing shoulder in the hole limiting downward movement of the ball relatively to the shank, a compression spring in the hole in the shank urging the blade to project from the end of the shank into a position wherein the ball engages said shoulder, and means for rotating the shank.

9. A deburring and chamfering tool comprising a shank rotatable about its longitudinal central axis, a pivot axially slidable in the lower end of the shank, a blade having only two cutting edges disposed on opposite sides of said axis slidable and swingable in a diametric slot in the shank and in a diametric slot in the bottom of the pilot, spring means yieldably urging the pilot into projected position with relation to the shank, spring means urging the blade into projected position with respect to the shank, and means limiting the distance that the blade can be projected from the shank by the last-mentioned spring means.

10. A deburring and chamfering tool comprising a shank rotatable about its longitudinal central axis, a pilot axially slidable in the lower end of the shank, a blade having only two cutting edges disposed on opposite sides of said axis slidable and swingable in a diametric slot in the shank and in a diametric slot in the bottom of the pilot, a compression spring compressed between the pilot and a portion of the blade yieldably urging the pilot into projected position relatively to the shank, and spring means yieldably urging the blade into projected position with respect to the shank.

11. A deburring and chamfering tool comprising a shank rotatable about its longitudinal central axis, a pilot axially slidable in the lower end of the shank, a blade having only two cutting edges disposed on opposite sides of said axis slidable and swingable in a diametric slot in the shank and in a diametric slot in the bottom of the pilot, a compression spring compressed between the pilot and a portion of the blade yieldably urging the pilot into projected position relatively to the shank, a pivot for the blade slidable axially with respect to the shank, spring means between the shank and pivot yieldably urging the pivot and blade toward the lower end of the shank, and means limiting downward movement of the pivot and blade with respect to the shank.

12. A deburring and chamfering tool comprising a shank rotatable about its longitudinal central axis, a pilot axially slidable in the lower end of the shank, a blade having only two cutting edges disposed on opposite sides of said axis slidable and swingable in a diametric slot in the shank and in a diametric slot in the bottom of the pilot, spring means yieldably urging the pilot into a projected position relatively to the shank, a pivot for the blade slidable in the shank, spring means urging the pivot to project the blade relatively to the shank, means limiting downward movement of the pivot and blade with respect to the shank, the pilot being engageable with the blade to limit its downward movement with respect to the shank.

References Cited in the file of this patent

UNITED STATES PATENTS

| | | |
|---|---|---|
| 308,842 | Hunt | Dec. 2, 1884 |
| 952,158 | Wattie | Mar. 15, 1910 |
| 1,053,531 | Platt | Feb. 18, 1913 |
| 2,187,221 | Brown | Jan. 16, 1940 |
| 2,364,293 | Hotchner | Dec. 5, 1944 |
| 2,628,513 | Packard | Feb. 17, 1953 |
| 2,703,996 | Reynolds et al. | Mar. 15, 1955 |

FOREIGN PATENTS

| | | |
|---|---|---|
| 227,894 | Great Britain | Jan. 15, 1925 |